United States Patent
Lombrozo et al.

(10) Patent No.: US 9,341,224 B2
(45) Date of Patent: May 17, 2016

(54) SYSTEMS FOR ABSORBING AN IMPACT FORCE

(71) Applicant: Google Inc., Mountain View, CA (US)

(72) Inventors: Peter Craig Lombrozo, Santa Cruz, CA (US); Felix Jose Alvarez Rivera, San Jose, CA (US); Daniel Lynn Larner, San Jose, CA (US); Thomas Daniel, San Francisco, CA (US)

(73) Assignee: Google Inc., Mountain View, CA (US)

( * ) Notice: Subject to any disclaimer, the term of this patent is extended or adjusted under 35 U.S.C. 154(b) by 101 days.

(21) Appl. No.: 14/276,086

(22) Filed: May 13, 2014

(65) Prior Publication Data

US 2015/0330473 A1    Nov. 19, 2015

(51) Int. Cl.
*F16M 13/00* (2006.01)
*F16F 6/00* (2006.01)
*F16F 7/08* (2006.01)
*B60Q 1/00* (2006.01)
*B60Q 1/04* (2006.01)

(52) U.S. Cl.
CPC . *F16F 6/005* (2013.01); *B60Q 1/00* (2013.01); *B60Q 1/04* (2013.01); *B60Q 1/0491* (2013.01); *F16F 7/08* (2013.01); *B60Q 1/0483* (2013.01)

(58) Field of Classification Search
CPC .............. F16F 6/005; F16F 7/08; B60Q 1/00; B60Q 1/04; B60Q 1/0483; B60Q 1/0491
USPC ......................................................... 248/569
See application file for complete search history.

(56) References Cited

U.S. PATENT DOCUMENTS

| 3,832,911 | A | 9/1974 | Daniel et al. |
| 3,860,258 | A | 1/1975 | Feustel et al. |
| 4,118,765 | A | 10/1978 | Atsuchi |
| 4,616,522 | A | 10/1986 | White et al. |
| 4,728,181 | A | 3/1988 | Kakinuma |

(Continued)

FOREIGN PATENT DOCUMENTS

| JP | 2000-118291 A | 4/2000 |
| JP | 2003-040136 A | 2/2003 |

(Continued)

OTHER PUBLICATIONS

International Search Report and Written Opinion issued in connection with International Patent Application No. PCT/US2015/030643 on Aug. 21, 2015, 10 pages.

*Primary Examiner* — Todd M Epps
(74) *Attorney, Agent, or Firm* — McDonnell Boehnen Hulbert Berghoff LLP

(57) ABSTRACT

A system is provided that includes a mounting module configured to be coupled to a support frame and an object-support module configured to support an object. The mounting module comprises an area configured to allow at least a portion of an object supported by the object-support module to pass through the area. The system further includes a motion-guiding module coupled to the object-support module and the mounting module. The motion-guiding module is configured to guide motion of the object-support module along a first axis of the system toward the mounting module in response to a threshold force applied to the object-support module along the first axis. The motion-guiding module is configured to resist motion of the object-support module along a second axis of the system that is perpendicular to the first axis of the system.

20 Claims, 10 Drawing Sheets

(56) References Cited

U.S. PATENT DOCUMENTS

| | | | |
|---|---|---|---|
| 5,732,801 A | 3/1998 | Gertz | |
| 7,597,166 B2 | 10/2009 | Parks | |
| 7,798,526 B2 | 9/2010 | Lopez et al. | |
| 8,246,091 B1 | 8/2012 | Jayasuriya et al. | |
| 8,267,445 B1 | 9/2012 | Jayasuriya et al. | |
| 8,909,428 B1 * | 12/2014 | Lombrozo | B62D 15/025 701/41 |
| 8,998,297 B1 * | 4/2015 | Khaykin | B60R 21/34 296/187.03 |
| 9,176,500 B1 * | 11/2015 | Teller | G05D 1/0088 |
| 2005/0052014 A1 * | 3/2005 | Lee | B62D 1/195 280/777 |
| 2005/0104391 A1 * | 5/2005 | Browne | B60R 19/03 293/132 |
| 2009/0034279 A1 | 2/2009 | Blandin et al. | |
| 2009/0115205 A1 | 5/2009 | Steller et al. | |
| 2012/0048056 A1 | 3/2012 | Matsu et al. | |
| 2013/0070471 A1 | 3/2013 | Pickholz | |
| 2013/0174368 A1 | 7/2013 | Mildner et al. | |
| 2015/0329037 A1 * | 11/2015 | Lombrozo | B60Q 1/0483 362/549 |

FOREIGN PATENT DOCUMENTS

| | | |
|---|---|---|
| WO | 2013082711 | 6/2013 |
| WO | 2013082711 A1 | 6/2013 |

\* cited by examiner

SYSTEMS FOR ABSORBING AN IMPACT FORCE

BACKGROUND

Unless otherwise indicated herein, the materials described in this section are not prior art to the claims in this application and are not admitted to be prior art by inclusion in this section.

A vehicle can include features that provide structural support or functionality to the vehicle while also increasing driver or pedestrian safety.

SUMMARY

In one example, a system is provided that includes a mounting module configured to be coupled to a support frame and an object-support module configured to support an object. The mounting module comprises an area configured to allow at least a portion of an object supported by the object-support module to pass through the area. The system further includes a motion-guiding module coupled to the object-support module and the mounting module. The motion-guiding module is configured to guide motion of the object-support module along a first axis of the system toward the mounting module in response to a threshold force applied to the object-support module along the first axis. The motion-guiding module is configured to resist motion of the object-support module along a second axis of the system that is perpendicular to the first axis of the system.

In another example, a vehicle is provided that includes a support frame configured to be coupled to a system that includes a mounting module configured to be coupled to the support frame and an object-support module configured to support a component of the vehicle. The mounting module comprises an area configured to allow at least a portion of the component supported by the object-support module to pass through the area. The system further includes a motion-guiding module coupled to the object-support module and the mounting module. The motion-guiding module is configured to guide motion of the object-support module along a first axis of the system toward the mounting module in response to a threshold force applied to the object-support module along the first axis. The motion-guiding module is configured to resist motion of the object-support module along a second axis of the system that is perpendicular to the first axis of the system.

In yet another example, a system is provided that includes a mounting module configured to be coupled to a support frame. The system further includes an object-support module configured to support an object. The mounting module or the object-support module further comprises a magnet. The system further includes a motion-guiding module coupled to the object-support module and the mounting module. The motion-guiding module comprises a rail configured to guide motion of the object-support module along an axis of the system toward the mounting module in response to a threshold force applied to the object-support module along the axis. The magnet and the motion-guiding module are attracted by a magnetic force to resist motion of the object-support module along the axis.

These as well as other aspects, advantages, and alternatives, will become apparent to those of ordinary skill in the art by reading the following detailed description, with reference where appropriate to the accompanying figures.

DETAILED DESCRIPTION

Figure 1:
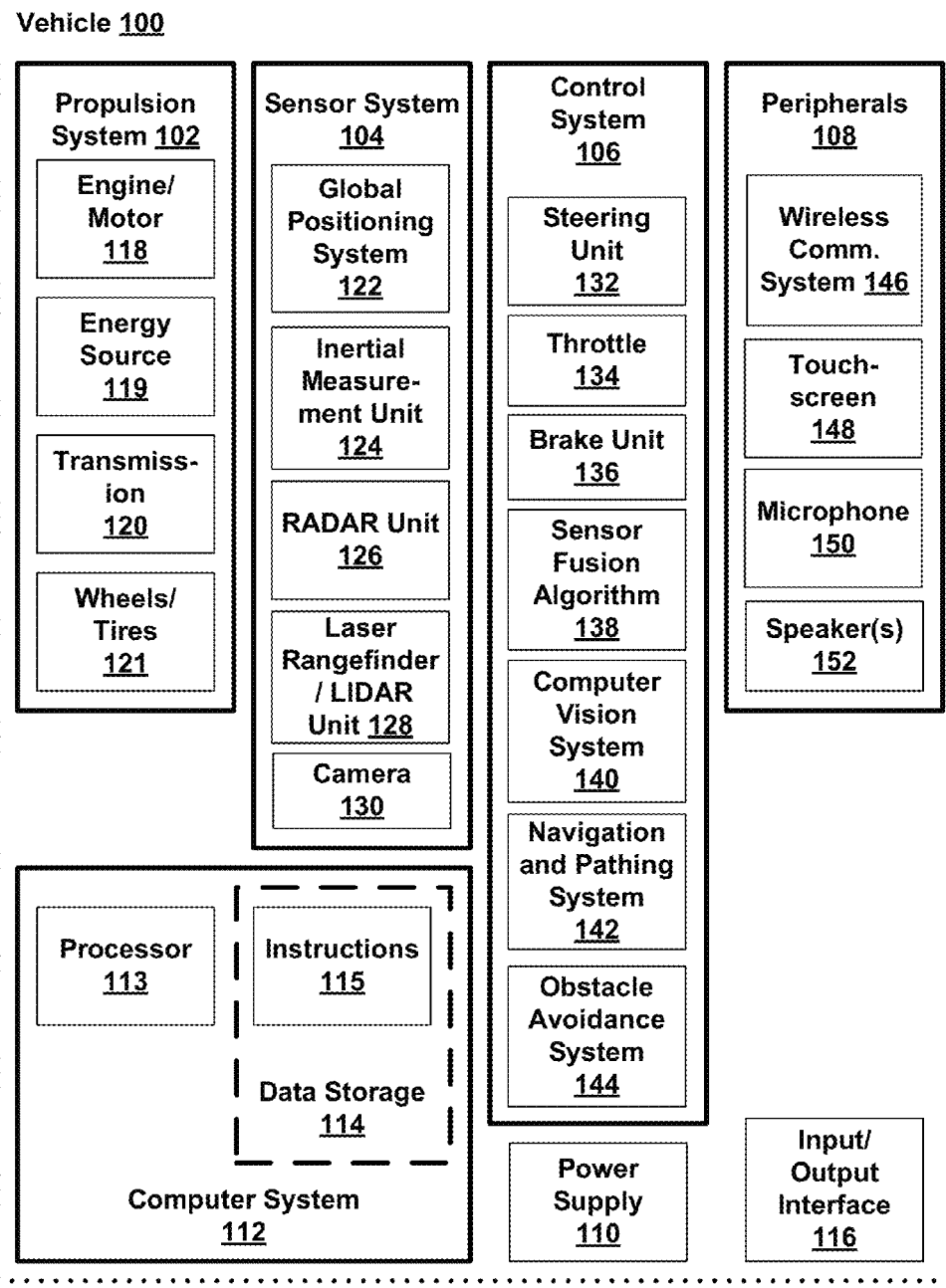
FIG. 1 is a functional block diagram illustrating a vehicle, according to an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

In one example, a system is provided that may absorb a force that impacts an object mounted to a vehicle during a collision. The system may include a mounting module, an object-support module, and a motion-guiding module. The mounting module may be configured to be coupled to a support frame of a vehicle such as a car. For instance, the mounting module could be coupled to the support frame via fasteners such as bolts, screws, or rivets, among other examples. The mounting module may secure the system to the support frame and may include an area that allows a vehicle component supported by the object-support module to pass through the area.

The object-support module may be configured to support various components of the vehicle, such as a headlight, or sensors such as radar units, cameras, or inertial measurement units. For example, a vehicle component may be mounted to the object-support module via fasteners such as bolts, screws, or rivets, among other examples. The object-support module may be configured to move along a first axis of the system toward the mounting module or the support frame of the vehicle in response to a threshold force being applied to the object-support module. In contrast, the object-support module may remain substantially stationary in response to an impact force being applied to the object-support module that is weaker than the threshold force.

The motion-guiding module may have several functions. First, the motion-guiding module may guide movement of the object-support module toward the mounting module in response to the threshold force being applied to the object-support module. For example, the motion-guiding module may include metal rails that are aligned with the mounting module to allow sliding motion of the object-support module toward the mounting module. In some cases, the mounting module may include a magnet that applies an attractive force to the motion-guiding module, which may cause the object-support module to remain stationary unless the threshold force is applied to the object-support module. That is, the threshold force may be a force strong enough to overcome the attraction between the magnet and the motion-guiding module. The motion-guiding module may also include one or more friction strips on the metal rails that resist motion of the object-support module by generating friction between the motion-guiding module and the mounting module. In another embodiment, the motion-guiding module may include a compressible section that is configured to compress in response to the threshold force being applied to the object-support module. Whether taking the form of a compressible section, metal rails, or other forms, the motion-guiding module may also be configured to resist movement of the object-support module in a second axis of the system that is perpendicular to the first axis. Other examples are possible.

Referring now to the figures, FIG. 1 is a functional block diagram illustrating a vehicle 100, according to an example embodiment. The vehicle 100 could be configured to operate fully or partially in an autonomous mode. For example, the vehicle 100 could be self-controlling while in the autonomous mode, and may be configured to determine a current state of the vehicle 100, determine an environment of the vehicle 100, determine a predicted behavior of at least one other vehicle in the environment, determine a confidence level that may correspond to a likelihood of the at least one other vehicle to perform the predicted behavior, and control the vehicle 100 based on the determined information. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, and an input/output interface 116. The vehicle 100 may include more or fewer subsystems and each subsystem could include multiple elements. Further, each of the subsystems and elements of the vehicle 100 could be interconnected. Thus, one or more of the described functions of the vehicle 100 may be divided into additional functional or physical components, or combined into fewer functional or physical components. In some further examples, additional functional and/or physical components may be added to the examples illustrated by FIG. 1.

The propulsion system 102 may include components configured to provide motion for the vehicle 100. In an example embodiment, the propulsion system 102 could include an engine/motor 118, an energy source 119, a transmission 120, and wheels/tires 121. The engine/motor 118 could be any combination of an internal combustion engine, an electric motor, a steam engine, a Stirling engine, or other types of engines and/or motors. In some embodiments, the engine/motor 118 may be configured to convert the energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. That is, the engine/motor 118 could be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are configured to transmit mechanical power from the engine/motor 118 to the wheels/tires 121. To this end, the transmission 120 could include a gearbox, a clutch, a differential, and drive shafts. The transmission 120 could include other elements. The drive shafts could include one or more axles that could be coupled to the one or more wheels/tires 121.

The wheels/tires 121 of vehicle 100 could be configured in various formats, including a unicycle, a bicycle/motorcycle, a tricycle, or a car/truck four-wheel format. Other wheel/tire geometries are possible, such as those including six or more wheels. Any combination of the wheels/tires 121 of the vehicle 100 may be configured to rotate differentially with respect to other wheels/tires 121. The wheels/tires 121 could represent at least one wheel that is attached to the transmission 120 and at least one tire coupled to a rim of a wheel that could make contact with a driving surface. The wheels/tires 121 could include any combination of metal and rubber, or another combination of materials.

The sensor system 104 may include a number of sensors configured to sense information about an environment of the vehicle 100. For example, the sensor system 104 could include a Global Positioning System (GPS) 122, an inertial measurement unit (IMU) 124, a RADAR unit 126, a laser rangefinder/LIDAR unit 128, and a camera 130. The sensor system 104 could also include sensors configured to monitor internal systems of the vehicle 100 (e.g., an $O_2$ monitor, a fuel gauge, or an engine oil pressure gauge). Other sensors are possible as well.

One or more of the sensors included in the sensor system 104 could be configured to be actuated separately and/or collectively in order to modify a position and/or an orientation of the one or more sensors.

The Global Positioning System (GPS) 122 may be any sensor configured to determine a location of the vehicle 100. To this end, the GPS 122 could include a transceiver configured to provide information regarding the position of the vehicle 100 with respect to the Earth.

The IMU 124 could include any combination of sensors (e.g., accelerometers and gyroscopes) configured to sense position and orientation changes of the vehicle 100 based on inertial acceleration.

The RADAR unit 126 may represent a system that utilizes radio signals to sense objects within the environment of the vehicle 100. In some embodiments, in addition to sensing the objects, the RADAR unit 126 may additionally be configured to sense the speed and/or direction of motion of the objects.

Similarly, the laser rangefinder/LIDAR unit 128 may be any sensor configured to sense objects in the environment of the vehicle 100 by using lasers. In an example embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 could include one or more devices configured to capture a plurality of images of the environment of the vehicle 100. The camera 130 could be configured to captures still frames and/or continuous video.

The control system 106 may be configured to control operation of the vehicle 100 and its components. Accordingly, the control system 106 could include various elements including a steering unit 132, a throttle 134, a brake unit 136, a sensor fusion algorithm 138, a computer vision system 140, a navigation and pathing system 142, and an obstacle avoidance system 144.

The steering unit 132 could represent any combination of mechanisms that may be configured to adjust a direction of motion of the vehicle 100. For example, a steering wheel or steering column may be mechanically coupled to the wheels/tires 121 and turning the steering wheel or steering column may cause the wheels/tires 121 to change the direction of motion of the vehicle 100.

The throttle 134 could be configured to control, for instance, the operating speed of the engine/motor 118 and, in turn, control the speed of the vehicle 100. For example, the throttle 134 may be configured to increase or decrease a rate of energy conversion of the energy source 119 that is converted to mechanical energy by the engine/motor 118.

The brake unit 136 could include any combination of mechanisms configured to decelerate the vehicle 100. The brake unit 136 could use disc or drum brakes that use friction to slow rotation of the wheels/tires 121. In other embodiments, the brake unit 136 could convert kinetic energy of the wheels/tires 121 to electric current. The brake unit 136 may take other forms as well.

The sensor fusion algorithm 138 may be an algorithm configured to accept data from the sensor system 104 as an input. (The sensor fusion algorithm 138 may be data representing the sensor fusion algorithm stored in the data storage 114.) The input data may include, for example, data representing information sensed by the sensors of the sensor system 104. The sensor fusion algorithm 138 could include, for instance, a Kalman filter, a Bayesian network, or another algorithm. The sensor fusion algorithm 138 could further provide various assessments based on the data from the sensor system 104. In an example embodiment, the assessments could include evaluations of individual objects and/or features in the environment of vehicle 100, an evaluation of a particular situation, or evaluations of possible impacts based on the particular situation. Other assessments are possible.

The computer vision system 140 may be any system configured to process and analyze images captured by the camera 130 in order to identify objects or features in the environment of vehicle 100, including traffic signals, roadway boundaries, and obstacles. The computer vision system 140 could use an object recognition algorithm, a Structure From Motion (SFM) algorithm, video tracking, and other computer vision techniques. In some embodiments, the computer vision system 140 could be additionally configured to map an environment, track objects, or estimate the speed of objects.

The navigation and pathing system 142 may be any system configured to determine a driving path for the vehicle 100. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 could represent a control system configured to identify, evaluate, and avoid or otherwise negotiate potential obstacles in the environment of the vehicle 100.

The control system 106 may additionally or alternatively include components other than those shown and described.

Peripherals 108 may be configured to receive input data or provide outputs, including to or from external sensors, other vehicles, and other computer systems. For example, peripherals 108 could include a wireless communication system 146, a touchscreen 148, a microphone 150, and a speaker 152.

In one example, the wireless communication system 146 could be configured to wirelessly communicate with one or more devices directly or via a communication network. For example, the wireless communication system 146 could use 3G cellular communication, such as CDMA, EVDO, GSM/GPRS, or 4G cellular communication, such as WiMAX or LTE. Alternatively, the wireless communication system 146 could communicate with a wireless local area network (WLAN), for example, using WiFi. In some embodiments, the wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

In an example embodiment, the touchscreen 148 may be configured to display information, including information describing a state of the vehicle 100. The input/output interface 116 could also be configured to accept input from the touchscreen 148. The touchscreen 148 may be configured to sense a position and/or a movement of a finger via capacitive sensing, resistance sensing, or a surface acoustic wave process, among other possibilities. The touchscreen 148 may be capable of sensing finger movement in a direction parallel or planar to the touchscreen surface, or in a direction normal to the touchscreen surface, and may also be capable of sensing a level of pressure applied to the surface of the touchscreen 148. The touchscreen 148 may be formed of one or more translucent or transparent insulating layers and one or more translucent or transparent conducting layers. The touchscreen 148 may take other forms as well.

The microphone 150 may be configured to detect sound waves (e.g., a voice command) and convert the sound waves into audio signals for use by the computer system 112. Similarly, the speakers 152 may be configured to receive audio signals and convert the audio signals into sound waves.

The power supply 110 may provide power to various components of the vehicle 100 and could represent, for example, a rechargeable lithium-ion or lead-acid battery. In some embodiments, one or more banks of such batteries could be configured to provide electrical power to the vehicle 100. Other power supply components and configurations are possible. In some embodiments, the power supply 110 and the energy source 119 could be implemented together, as in some all-electric cars.

Many or all of the functions of the vehicle 100 could be controlled by the computer system 112. The computer system 112 may include at least one processor 113 (which could include at least one microprocessor) that executes the instructions 115 stored in a non-transitory computer readable medium, such as the data storage 114. The computer system 112 may also represent a plurality of processors or computing devices that may serve to control individual components or subsystems of the vehicle 100 in a distributed fashion.

In some embodiments, the data storage 114 may contain the instructions 115 (e.g., program logic) executable by the processor 113 to execute various functions of vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during the operation of the vehicle 100 in the autonomous, semi-autonomous, and/or manual modes.

The computer system 112 may control the function of the vehicle 100 based on inputs received from various subsystems (e.g., the propulsion system 102, the sensor system 104, and the control system 106), as well as from the input/output interface 116. For example, the computer system 112 may utilize input from the control system 106 in order to control the steering unit 132 to avoid an obstacle detected by the sensor system 104 and the obstacle avoidance system 144. In an example embodiment, the computer system 112 could be configured to provide control over many aspects of the vehicle 100 and its subsystems.

The vehicle 100 may include an input/output interface 116 for providing information for output or receiving input from the peripherals 108. The input/output interface 116 could control or enable control of content and/or a layout of interactive images that could be displayed on the touchscreen 148. Further, the input/output interface 116 could include one or more input/output devices within the set of peripherals 108, such as the wireless communication system 146, the touchscreen 148, the microphone 150, and the speaker 152.

Although FIG. 1 shows various components of the vehicle 100, i.e., the wireless communication system 146, the computer system 112, the data storage 114, and the input/output interface 116, as being integrated into the vehicle 100, one or more of these components could be mounted or associated separately from the vehicle 100. For example, the data storage 114 could, in part or in full, exist separate from the vehicle 100. Thus, the vehicle 100 could be provided in the form of device elements that may be located separately or together. The device elements that make up the vehicle 100 could be communicatively coupled together in a wired and/or wireless fashion.

Figure 2:
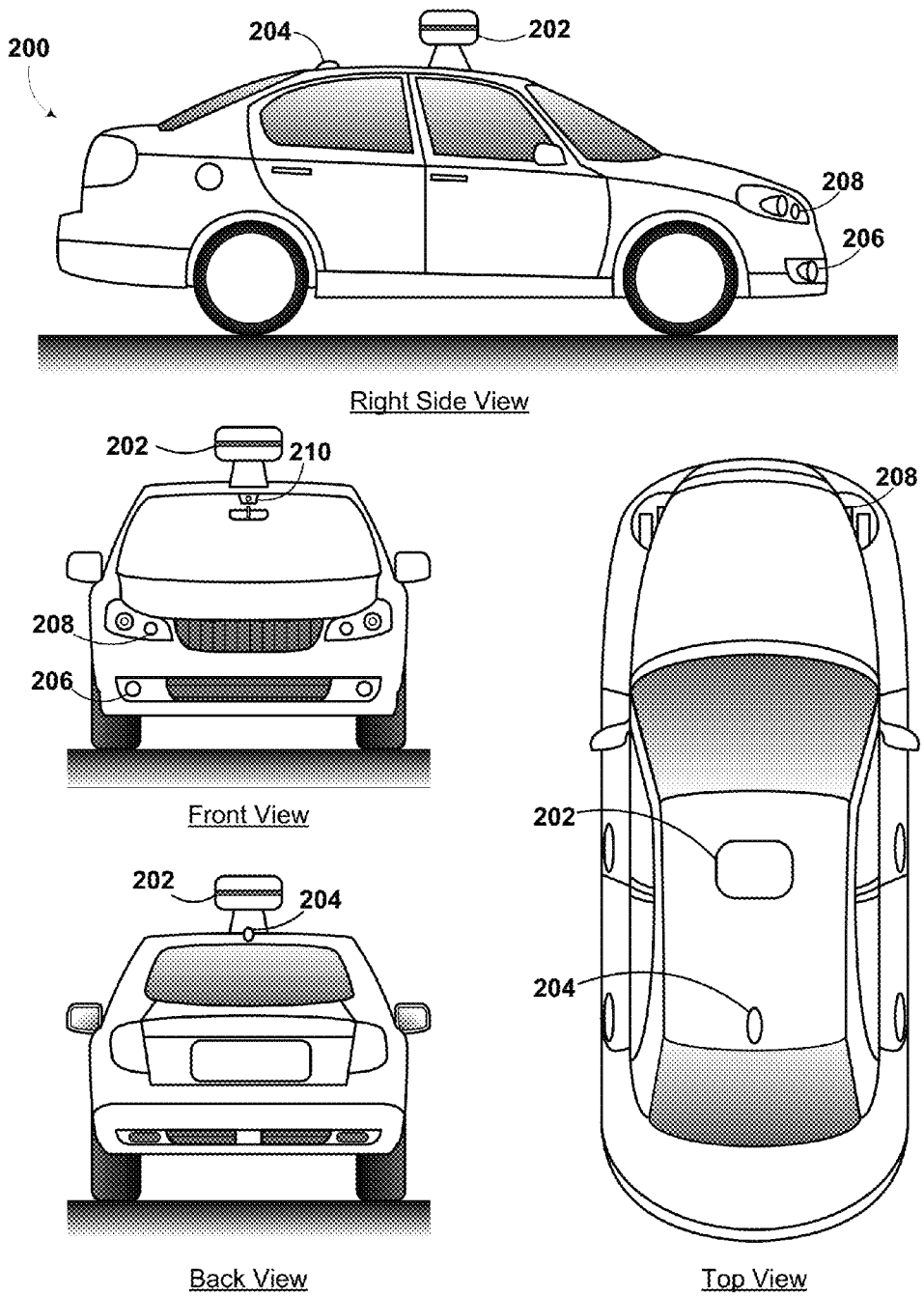
FIG. 2 depicts an example vehicle.

FIG. 2 depicts an example vehicle 200 that could be similar to the vehicle 100 described in FIG. 1. Although the vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

In some embodiments, the vehicle 200 could include a sensor unit 202, a wireless communication system 204, a LIDAR unit 206, a laser rangefinder unit 208, and a camera 210. The elements of the vehicle 200 could include some or all of the elements described as part of the vehicle 100, depicted in FIG. 1.

The sensor unit 202 could include one or more different sensors configured to capture information about an environment of the vehicle 200. For example, the sensor unit 202 could include any combination of cameras, RADARs, LIDARs, range finders, and acoustic sensors. Other types of sensors are possible. In an example embodiment, the sensor unit 202 could include one or more movable mounts that could be configured to adjust the orientation of one or more sensors in the sensor unit 202. In one embodiment, the movable mount could include a rotating platform that could scan sensors so as to obtain information from many directions around the vehicle 200. In another embodiment, the movable mount of the sensor unit 202 could be moveable in a scanning fashion within a particular range of angles and/or azimuths. The sensor unit 202 could be mounted atop a roof of the vehicle 200, for instance, however other mounting locations are possible. Additionally, the sensors of the sensor unit 202 could be distributed in different locations and need not be in a single location. Some possible sensor types and mounting locations include the LIDAR unit 206 and the laser rangefinder unit 208, as depicted in FIG. 2. Furthermore, each sensor of the sensor unit 202 could be configured to be moved or scanned independently of other sensors of the sensor unit 202.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other communication standards directed towards intelligent transport systems.

The camera 210 may be any camera (e.g., a still camera, a video camera, etc.) configured to capture a plurality of images of the environment of the vehicle 200. To this end, the camera 210 may be configured to detect visible light, or may be configured to detect light from other portions of an electromagnetic spectrum, such as infrared or ultraviolet light. Other types of cameras are possible as well.

The camera 210 may be a two-dimensional detector, or may have a three-dimensional spatial range. In some embodiments, the camera 210 may be, for example, a range detector configured to generate a two-dimensional image indicating a distance from the camera 210 to a number of points in the environment. To this end, the camera 210 may use one or more range detecting techniques. For example, the camera 210 may use a structured light technique in which the vehicle 200 illuminates an object in the environment with a predetermined light pattern, such as a grid or checkerboard pattern and uses the camera 210 to detect a reflection of the predetermined light pattern from the object. Based on distortions in the reflected light pattern, the vehicle 200 may determine the distance to the points on the object. The predetermined light pattern may comprise infrared light, or light of another wavelength. As another example, the camera 210 may use a laser scanning technique in which the vehicle 200 emits a laser and scans across a number of points on an object in the environment. While scanning the object, the vehicle 200 may use the camera 210 to detect a reflection of the laser from various points of the object. Based on a length of time it takes the laser to reflect from the object at various points, the vehicle 200 may determine the distance to the points on the object. As yet another example, the camera 210 may use a time-of-flight technique in which the vehicle 200 emits a light pulse and uses the camera 210 to detect a reflection of the light pulse from an object at a number of points on the object. In particular, the camera 210 may include a number of pixels, and respective pixels may detect the reflection of the light pulse from a point on the object. Based on a length of time it takes the light pulse to reflect from the object at various points, the vehicle 200 may determine the distance to the points on the object. The light pulse may be a laser pulse. Other range detecting techniques are possible as well, including stereo triangulation, sheet-of-light triangulation, interferometry, and coded aperture techniques, among others. The camera 210 may take other forms as well.

The camera 210 could be mounted inside a front windshield of the vehicle 200. Specifically, as illustrated in FIG. 2, the camera 210 could capture images from a forward-looking view with respect to the vehicle 200. Other mounting locations and viewing angles of camera 210 are possible, either inside or outside the vehicle 200.

The camera 210 could have associated optics that could be configured to provide an adjustable field of view. Further, the camera 210 could be mounted to vehicle 200 with a movable mount that could be configured to vary a pointing angle of the camera 210.

Figure 3:
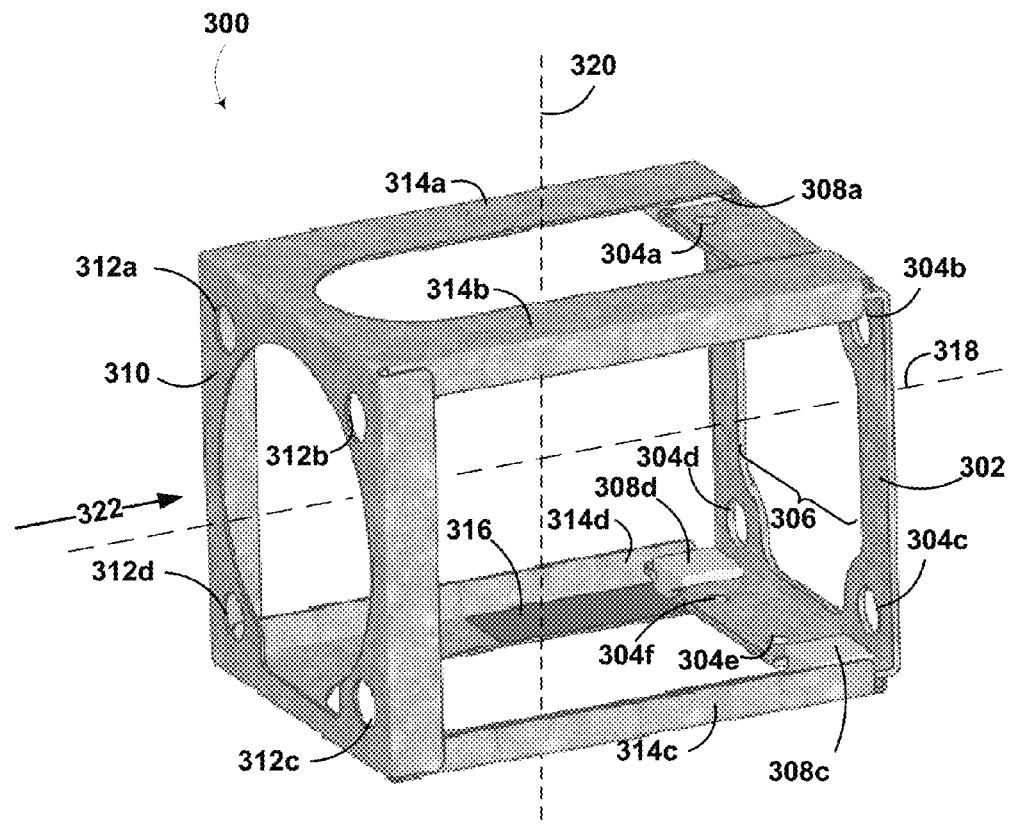
FIG. 3 illustrates an example system for absorbing an impact force.

FIG. 3 illustrates an example system 300 in accordance with at least some embodiments disclosed herein. FIG. 3 includes a mounting module 302, holes 304a, 304b, 304c, 304d,-304e, and 304f, a receiving area 306, magnets 308a, 308c, and 308d, an object-support module 310, mounting holes 312a, 312b, 312c, and 312d, a motion-guiding module comprising rails 314a, 314b, 314c, and 314d, a friction strip 316, a first axis 318 of the system 300, a second axis 320 of the system 300, and a threshold force 322.

A portion of the mounting module 302 may be a plate-like apparatus comprising the holes 304a-f and the receiving area 306. The mounting module 302 may be made of metal or other materials configured to bear loads and could further include the magnets 308a, 308c, and 308d (hereinafter magnets 308a-d). In other examples, the magnets 308a-d could be included as part of the object-support module 310. The magnets 308a-d may be configured to respectively apply an attractive magnetic force to the rails 314a-d of the motion-guiding module.

The mounting module 302 may be configured to be coupled to a support frame, such as a support frame of a car, boat, or airplane, for example. The mounting module 302 may be coupled to the support frame via bolts or screws that pass through the holes 304a-f. In other examples, the holes 304b-d may be used for tool access, such as for adjusting a headlight. (See FIG. 9 for an illustration of an example mounting module mounted to a support frame of a vehicle.) Other fastener examples are possible. In some embodiments, some of the holes 304a-f may instead be used to allow portions of an object supported by the object-support module 310 to pass through the holes 304a-f. Other examples are possible.

The receiving area 306 may be configured to allow at least a portion of an object (not pictured) supported by the object-support module 310 to pass through the receiving area 306. For example, a portion of an object such as a vehicle headlight coupled to the object-support module 310 (or a hose or wiring attached to the headlight) may be configured to pass through the receiving area 306 as the object-support module 310 or the vehicle headlight moves toward the mounting module 302. Such motion may occur in response to the threshold force 322 being applied to the vehicle headlight or the object-support module 310. For instance, the threshold force 322 may impact an illuminating end of the vehicle headlight, causing the vehicle headlight and the object-support module 310 to move rightward (as depicted in FIG. 3) toward the mounting module 302. Here, a back non-illuminating end of the vehicle headlight may pass through the receiving area 306. (See FIG. 10 for a more detailed depiction of a portion of an object passing through a receiving area in response to an impact force.)

The object-support module 310 may be configured to be coupled to, and to support, an object such as a headlight, sensor, or other vehicle component. (See FIG. 9 or 10 for an illustration of an example object mounted to an object-support module.) The object-support module 310 may be made of metal or other materials configured to bear loads and may be coupled to the object via bolts or screws that pass through the mounting holes 312a-d. Other fastener examples are possible. The object-support module 310 may be fixedly coupled to the rails 314a-d of the motion-guiding module. The object-support module 310 and the rails 314a-d may be configured to move together with respect to the mounting module 302. (In other examples, the mounting module 302 and the rails 314a-d of the motion-guiding module may be fixedly coupled and configured to move together relative to the object-support module 310.) As shown in FIG. 3, the object-support module 310 and the rails 314a-d are formed from a single piece of metal, but in other examples the object-support module 310 and the rails 314a-d of the motion-guiding module may be separate pieces that are coupled together via bolts, screws, or other fasteners.

The rails 314a-d of the motion-guiding module may be coupled to the object-support module 310 and the mounting module 302. As depicted in FIG. 3, the rails 314a-d may be fixedly coupled to the object-support module 310 and movably coupled to the mounting module 302. In other examples, the rails 314a-d may be fixedly coupled to the mounting module 302 and movably coupled to object-support module 310.

The rails 314a-d of the motion-guiding module may be configured to guide motion of the object-support module 310 along a first axis 318 of the system 300 toward the mounting module 302 in response to the threshold force 322 applied to the object-support module 310 along the first axis 318. The rails 314a-d of the motion-guiding module may be configured to resist motion of the object-support module 310 along a second axis 320 of the system 300 that is perpendicular to the first axis 318 of the system 300. In FIG. 3, the second axis 320 is depicted as substantially vertical, but the second axis 320 may represent any axis that is perpendicular to the first axis 318. For instance, the rails 314a-d may guide motion of the object-support module 310 along the first axis 318 in response to a force applied to the object-support module 310 along the first axis 318, but if a downward force is applied to the object-support module 310 along the second axis 320, the rails 314a-b located on a top side of the motion-guiding module may resist (pull against) downward movement of the object-support module 310 and the rails 314c-d located on a bottom side of the motion-guiding module may resist (push against) downward movement of the object-support module 310.

The rails 314a-d of the motion-guiding module may be configured to absorb impact forces applied to the object-support module 310 along the first axis 318. The rails 314a-d may also absorb impact forces that are not entirely aligned with the first axis 318. Components of such impact forces may be aligned with the first axis 318. The magnets 308a-d may exert an attractive magnetic force to respective rails 314a-d of the motion-guiding module that tends to resist motion of the object-support module 310 and the motion-guiding module relative to the mounting module 302. In examples where the magnets 308a-d are included as part of the object-support module 310, the magnets 308a-d may exert an attractive magnetic force to respective rails 314a-d of the motion-guiding module that tends to resist motion of the mounting module 302 and the rails 314a-d of the motion-guiding module relative to the object-support module 310. In one example, the mounting module 302 may include three magnets 308a, 308c, and 308d each corresponding to respective rails 314a, 314c, and 314d of the motion-guiding module. The mounting module 302 may also include a fourth magnet (not pictured) corresponding to the rail 314b. Other examples are possible.

Also, the rails 314a-d of the motion-guiding module may include at least one friction strip 316. In one example, the motion-guiding module may include four friction strips 316 each corresponding to a respective rails 314a-d of the motion-guiding module. The friction strip(s) 316 may include friction tape or other adhesive materials configured to enhance friction between the mounting module 302 and the respective rails 314a-d of the motion-guiding module. In other examples, the friction strip(s) 316 may enhance friction between the object-support module 310 and the rails 314a-d. The friction strip(s) 316 could also include a friction-inducing material coating or treatment on the rails 314a-d, whereby a coefficient of friction between the rails 314a-d and the mounting module 302 may vary as the mounting module 302 moves along the first axis with respect to the rails 314a-d. As the magnets 308a-d or other portions of the mounting module 302 move across the friction strip(s) 316, kinetic energy of the rails 314a-d or the object-support module 310 may be converted into friction-induced heat. In another example, the rails 314a-d of the motion-guiding module may not include the friction strip(s) 316 and the magnets 308a-d may generate friction as the magnets 308a-d move against the respective rails 314a-d of the motion-guiding module. Other examples are possible.

The magnets 308a-d of the mounting module 302 may apply a substantially constant attractive (magnetic) force substantially along the second axis 320 of the system 300 to respective rails 314a-d of the motion-guiding module while the object-support module 310 is at any position along the first axis 318 of the system 300. Substantially along the second axis 320 may include a range of angles such as parallel with the second axis 320 plus or minus 5 degrees. The force respectively applied by the magnets 308a-d to the rails 314a-d of the motion-guiding module may be substantially constant because positions of the magnets 308a-d with respect to the rails 314a-d of the motion-guiding module along the second axis 320 may not substantially change as the object-support module 310 moves along the first axis 318. The substantially constant force applied by the magnets 308a-d may resist motion of the object-support module 310 along the first axis 318 of the system. For example, the substantially constant attractive force may enhance friction between the rails 314a-d of the motion-guiding module and the magnets 308a-d, or movement of the object-support module 310 along the first axis 318 may cause the attractive force between the magnets 308a-d and the rails 314a-d of the motion-guiding module to become aligned slightly off-axis from the second axis 320, such that a component of the attractive force resists motion of the object-support module 310 along the first axis 318.

In another example, the rails 314a-d may include portions of increased thickness (not shown) compared to other portions of the rails 314a-d. For example, respective rightward end portions of the rails 314a-d may include portions of increased thickness (with reference to the second axis 320) compared to other portions of the rails 314a-d. This may cause the attractive magnetic force between the magnets 308a-d and the rails 314a-d to be greater when the object-support module 310 is at a fully leftward position as compared to when the object-support module 310 and the rails 314a-d have moved some distance rightward toward the mounting module 302. In such an example, the rails 314a-d of the motion-guiding module may provide an increased force resisting motion of the object-support module 310 when the object-support module 310 is at a fully leftward position, as compared to when the object-support module 310 is at other positions along the first axis 318. The magnetic force resisting motion of the object-support module 310 along the first axis 318 may decrease as the magnets 308a-d break contact with the portions of the rails 314a-d having increased thickness. Portions of increased thickness could similarly be included at other portions of the rails 314a-d to provide an increased magnetic force between the magnets 308a-d and the rails 314a-d as the object-support module 310 reaches any point of motion along the first axis 318.

Figure 4:
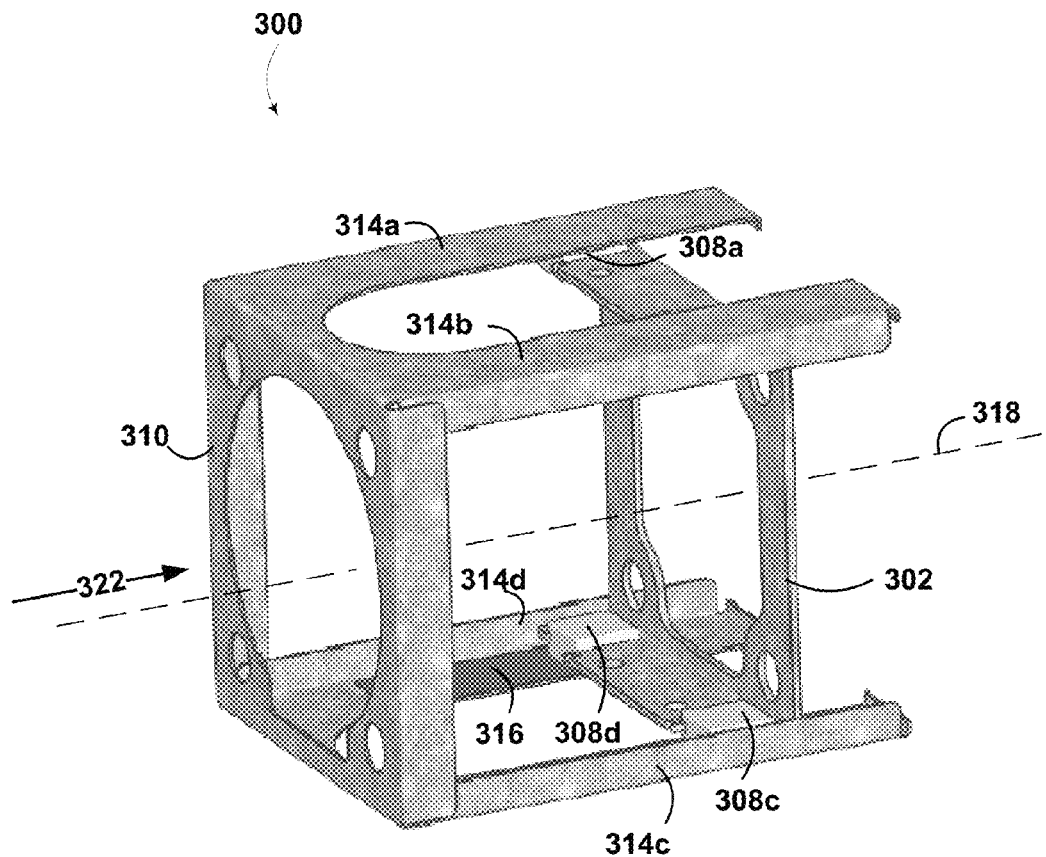
FIG. 4 illustrates an example system for absorbing an impact force.

FIG. 4 illustrates the example system 300 in accordance with at least some embodiments disclosed herein.

FIG. 4 may depict the system 300 after the threshold force 322 has been applied to the object-support module 310. In FIG. 4, the object-support module 310 and the rails 314a-d of the motion-guiding module have moved along the first axis 318 of the system 300 in response to the threshold force 322 being applied to the object-support module 310 (in a rightward direction as depicted in FIG. 4). The object-support module 310 and the rails 314a-d of the motion-guiding module may be configured to move closer to the mounting module 302 than shown in FIG. 4. For instance, the object-support module 310 and the rails 314a-d of the motion-guiding module may be configured to move toward the mounting module 302, in response to the threshold force 322, until the object-support module 310 comes into contact with the mounting module 302. FIG. 4 may depict the system 300 after the magnets 308a, 308c, and 308d or the friction strip(s) 316 have absorbed a force applied to the object-support module 310 along the first axis 318.

Figure 5:
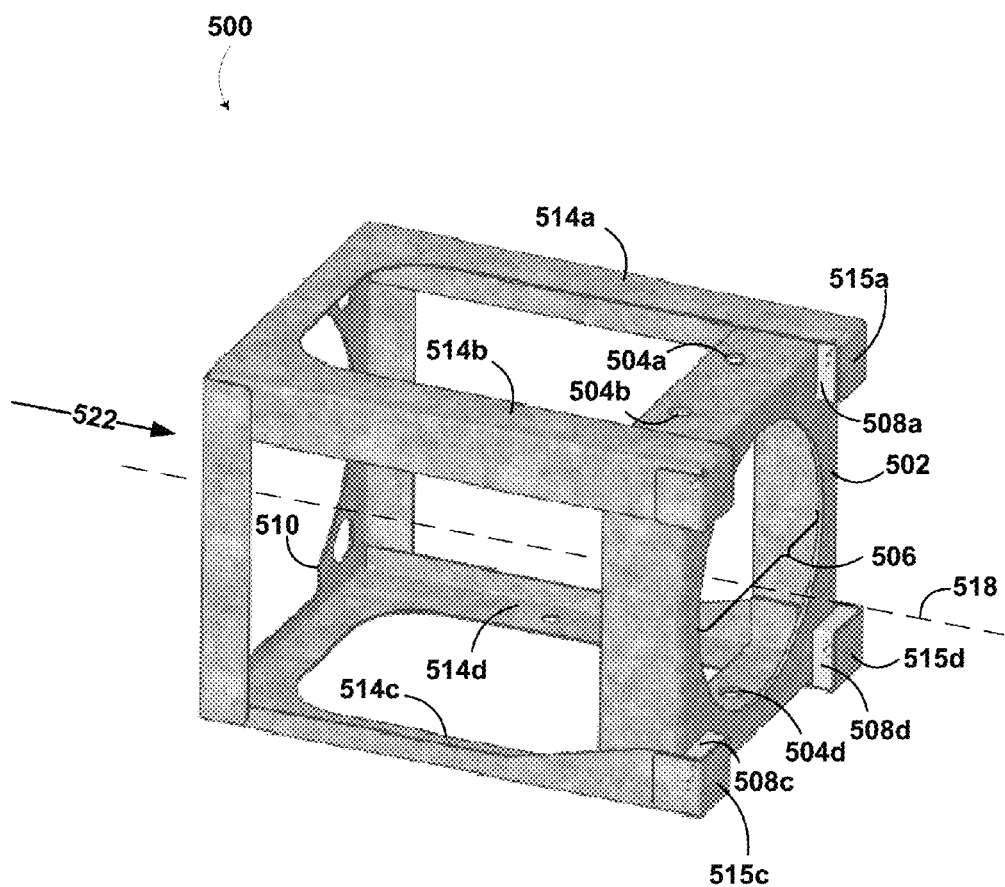
FIG. 5 illustrates an example system for absorbing an impact force.

FIG. 5 illustrates an example system 500 in accordance with at least some embodiments disclosed herein. FIG. 5 includes a mounting module 502, mounting holes 504a, 504b, 504d, a receiving area 506, magnets 508a, 508c, and 508d, an object-support module 510, a motion-guiding module comprising rails 514a, 514b, 514c, and 514d and back tabs 515a, 515c, and 515d, a first axis 518 of the system 500, and a threshold force 522.

The system 500 may be similar to the system 300 depicted in FIGS. 3 and 4. For example, the mounting module 502 may be coupled to a support frame via fasteners and the mounting holes 504a, 504b, and 504d. Also, the receiving area 506 may be configured to allow an object (not shown) supported by the object-support module 510 to pass through the receiving area 506. Further, the object-support module 510 may move toward the mounting module 502 in response to the threshold force 522 being applied to the object-support module 510. However, the mounting module 502 may include magnets 508a, 508c, and 508d (hereinafter 508a-d) that apply an attractive magnetic force to the rails 514a-d of the motion-guiding module along the first axis 518 of the system 500. For instance, the magnets 508a-d may respectively apply attractive magnetic forces to back tabs 515a, 515c, and 515d (hereinafter 515a-d) of the motion-guiding module 514. The respective attractive forces applied by the magnets 508a-d to the back tabs 515a-d of the motion-guiding module 514 may decrease in magnitude as the magnets 508a-d lose contact with the back tabs 515a-d. Also, the magnets 508a-d may move away from the back tabs 515a-d as the object-support module 510 moves closer to the mounting module 502, also causing a decrease in magnitude of the attractive force between the magnets 508a-d and the back tabs 515a-d of the rails 514a-d of the motion-guiding module. The magnetic force applied by the magnets 508a-d to the rails 514a-d of the motion-guiding module may resist motion of the object-support module 510 along the first axis 518. In some examples, the magnets 508a-d may be included as part of the motion-guiding module and not the mounting module 502, but may otherwise have similar functionality in resisting motion of the object-support module 510 along the first axis 518. Other examples are possible.

Figure 6:
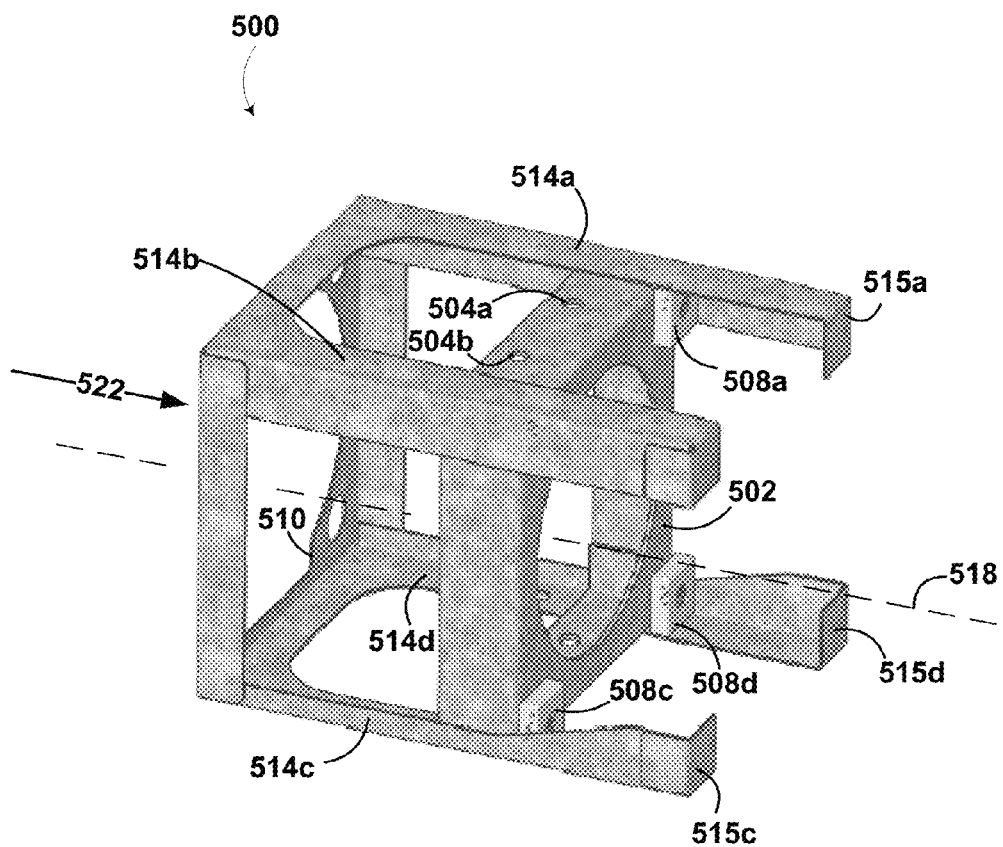
FIG. 6 illustrates an example system for absorbing an impact force.

FIG. 6 illustrates the example system 500 in accordance with at least some embodiments disclosed herein.

FIG. 6 may depict the system 500 after the threshold force 522 has been applied to the object-support module 510. In FIG. 6, the object-support module 510 and the rails 514a-d of the motion-guiding module have moved along the first axis 518 of the system 500 in response to the threshold force 522 being applied to the object-support module 510 (in a rightward direction as depicted in FIG. 6). The object-support module 510 and the rails 514a-d of the motion-guiding module may be configured to move even closer to the mounting module 502 than shown in FIG. 6. For instance, the object-support module 510 and the rails 504a-d of the motion-guiding module may be configured to move toward the mounting module 502, in response to an applied force, until the object-support module 510 comes into contact with the mounting module 502. FIG. 6 may depict the system 500 after the magnets 508a, 508c, and 508d have absorbed a force applied to the object-support module 510 applied along the first axis 518. The system 500 may be different from other example systems disclosed herein, in that once the magnets 508a, 508c, and 508d break contact with the back tabs 515a, 515c, and 515d, the threshold force 522 sufficient to move the object-support module 510 toward the mounting module 502 may decrease.

Figure 7:
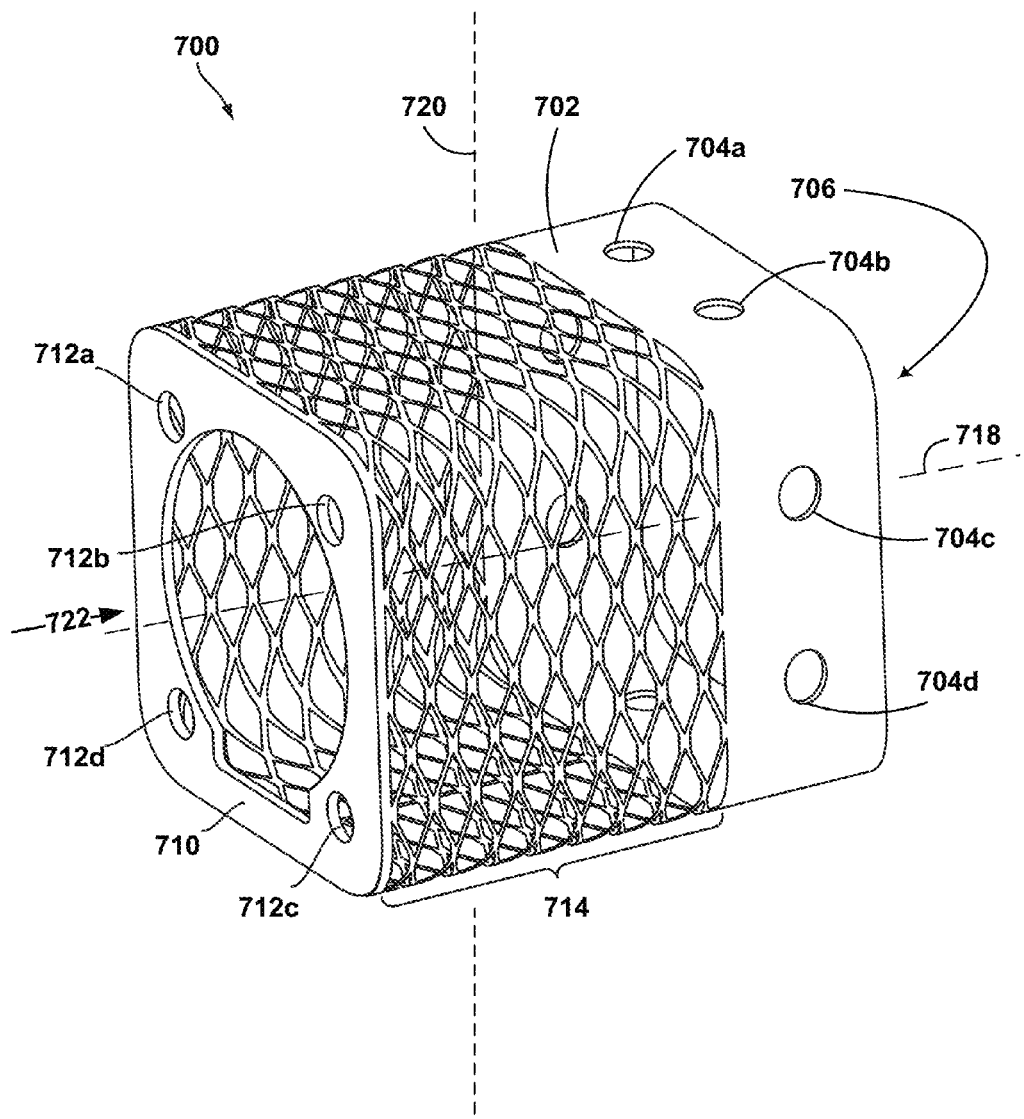
FIG. 7 illustrates an example system for absorbing an impact force.

FIG. 7 illustrates an example system 700 in accordance with at least some embodiments disclosed herein. The system 700 includes a mounting module 702, mounting holes 704a, 704b, 704c, and 704d, a receiving area 706, an object-support module 710, mounting holes 712a, 712b, 712c, and 712d, a motion-guiding module 714, a first axis 718 of the system 700, a second axis 720 of the system 700, and a threshold force 722.

A portion of the mounting module 702 may be a plate-like apparatus similar to the mounting module 302 of FIG. 3, or may be a collar-like apparatus comprising the mounting holes 704a-d and the receiving area 706 as depicted in FIG. 7. The mounting module 702 may be made of metal or other materials configured to bear loads and may be configured to be coupled to a support frame, such as a support frame of a car, boat, or airplane, for example. The mounting module 702 may be coupled to the support frame via bolts or screws that pass through the mounting holes 704a-d. Other fastener examples are possible. The receiving area 706 may be defined by a portion of a plane encircled by the mounting module 702 and may be configured to allow at least a portion of an object (not shown) supported by the object-support module 710 to pass through the receiving area 706. For example, a portion of an object such as a vehicle headlight may be configured to pass through the receiving area 706 as the object-support module 710 or the vehicle headlight moves toward the mounting module 702.

The object-support module 710 may be configured to be coupled to, and to support, an object such as a headlight, sensor, or other vehicle component. The object-support module 710 may be made of metal or other materials configured to bear loads and may be coupled to the object via bolts or screws that pass through the mounting holes 712a-d. Other fastener examples are possible. The object-support module 710 may be fixedly coupled to the motion-guiding module 714 and may be configured to move with respect to the mounting module 702 when the threshold force 722 is applied to the object-support module 710 along the first axis 718.

The motion-guiding module 714 may be coupled to the object-support module 710 and the mounting module 702. The motion-guiding module 714 may include a mesh or cage-like section configured to guide motion of the object-support module 710 along a first axis 718 of the system 700 toward the mounting module 702 in response to the threshold force 722 applied to the object-support module 710 along the first axis 718. For example, as the threshold force 722 is applied, the motion-guiding module 714 may compress or crush to allow the object-support module 710 to move toward the mounting module 702. In contrast, if a force weaker than the threshold force 722 is applied to the object-support module 710, the motion-guiding module 714 may resist motion of the object-support module 710 along the first axis 718. The motion-guiding module 714 may also be configured to resist motion of the object-support module 710 along a second axis 720 of the system 700 that is perpendicular to the first axis 718 of the system 700. In FIG. 7, the second axis 720 is depicted as substantially vertical, but the second axis 720 may represent any axis that is perpendicular to the first axis 718. For instance, the motion-guiding module 714 may guide motion of the object-support module 710 along the first axis 718 in response to a force applied to the object-support module 710 along the first axis 718, but if a downward force is applied to the object-support module 710, portions of the motion-guiding module 714 located on a top side of the motion-guiding module 714 may resist (pull against) downward movement of the object-support module 710 and portions of the motion-guiding module 714 located on a bottom side of the motion-guiding module 714 may resist (push against) downward movement of the object-support module 710.

The motion-guiding module 714 may be configured to absorb impact forces applied to the object-support module 710 along the first axis 718. For example, kinetic energy of the object-support module 710 may be absorbed as the motion-guiding module 714 is compressed or crushed to allow the object-support module 710 to move toward the mounting module 702. Such impact forces may include forces not completely aligned with the first axis 718 but that do include a component force aligned with the first axis 718.

Figure 8:
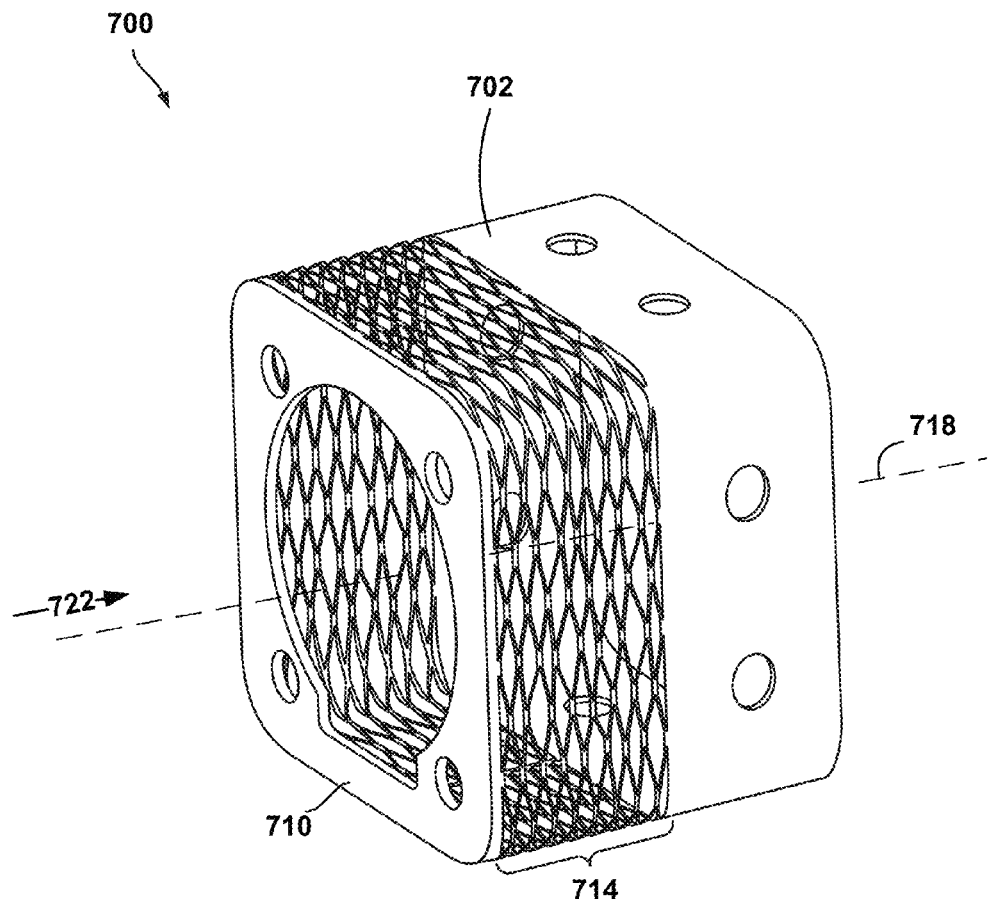
FIG. 8 illustrates an example system for absorbing an impact force.

FIG. 8 illustrates an example system 700 in accordance with at least some embodiments disclosed herein. The system 700 includes a mounting module 702, an object-support module 710, a motion-guiding module 714, a first axis 718 of the system 700, and a threshold force 722.

FIG. 8 may depict the system 700 after the threshold force 722 has been applied to the object-support module 710. In FIG. 8, the object-support module 710 has moved along the first axis 718 of the system 700 in response to the threshold force 722 being applied to the object-support module 710 (in a rightward direction as depicted in FIG. 8). The threshold force 722 may cause the motion-guiding module 714 to compress or crush, allowing the object-support module 710 to move toward the mounting module 702. The object-support module 710 may be configured to move even closer to the mounting module 702 than shown in FIG. 8. FIG. 8 may depict the system 700 after the motion-guiding module 714 absorbed a force applied to the object-support module 710 applied along the first axis 718.

Figure 9:
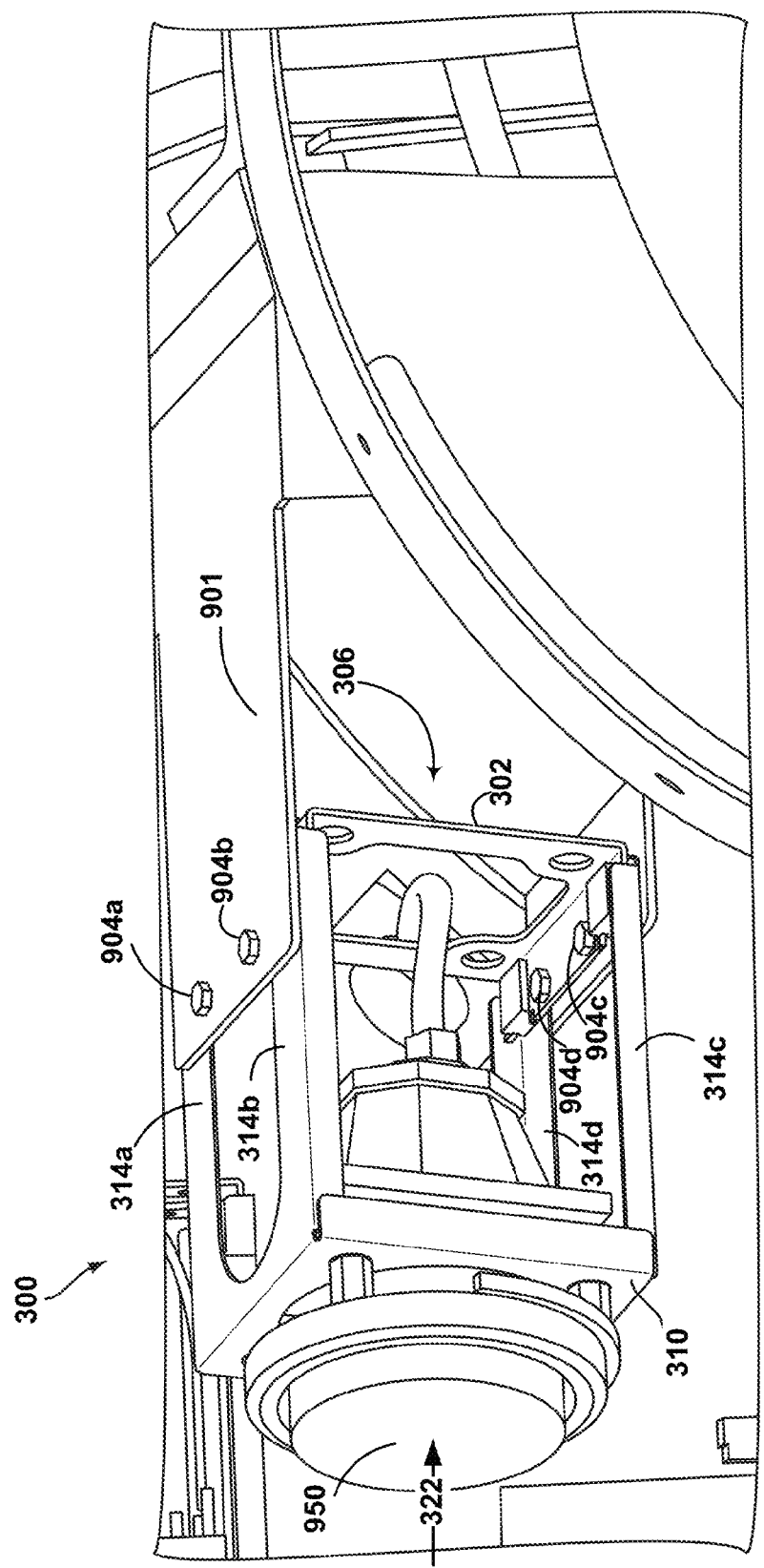
FIG. 9 illustrates an example system coupled to a vehicle support frame.

FIG. 9 illustrates the example system 300 coupled to a vehicle support frame, in accordance with at least some embodiments disclosed herein. FIG. 9 includes the support frame 901, fasteners 904a, 904b, 904c, and 904d, and an object 950.

The support frame 901 may be a support frame of a car, among other examples. The support frame may be rigidly coupled to the mounting module 302 via fasteners 904a-d and mounting holes of the mounting module 302. Other methods of fastening are possible. The mounting module 302 may include a receiving area 306 configured to allow the object 950 to pass through the receiving area 306.

The object-support module 310 may be coupled to an object 950, such as a vehicle headlight. The object-support module 310 may be configured to move, together with the object 950, along a first axis of the system 300 in response to the threshold force 322 being applied to the object 950 or the object-support module 310.

The motion-guiding module may include metal rails 314a-d configured to guide motion of the object-support module 310 along the first axis of the system 300. In other examples, the motion-guiding module may include a compressible section that compresses in response to the threshold force 322 applied to the object-support module 310, as depicted in FIGS. 7 and 8.

As shown in FIG. 9, the object 950 may be configured to move along with the object-support module 310 in response to the threshold force 322 being applied to the object 950 or the object-support module 310. Also, at least a portion of the object 950 may be configured to move through the receiving area 306.

Figure 10:
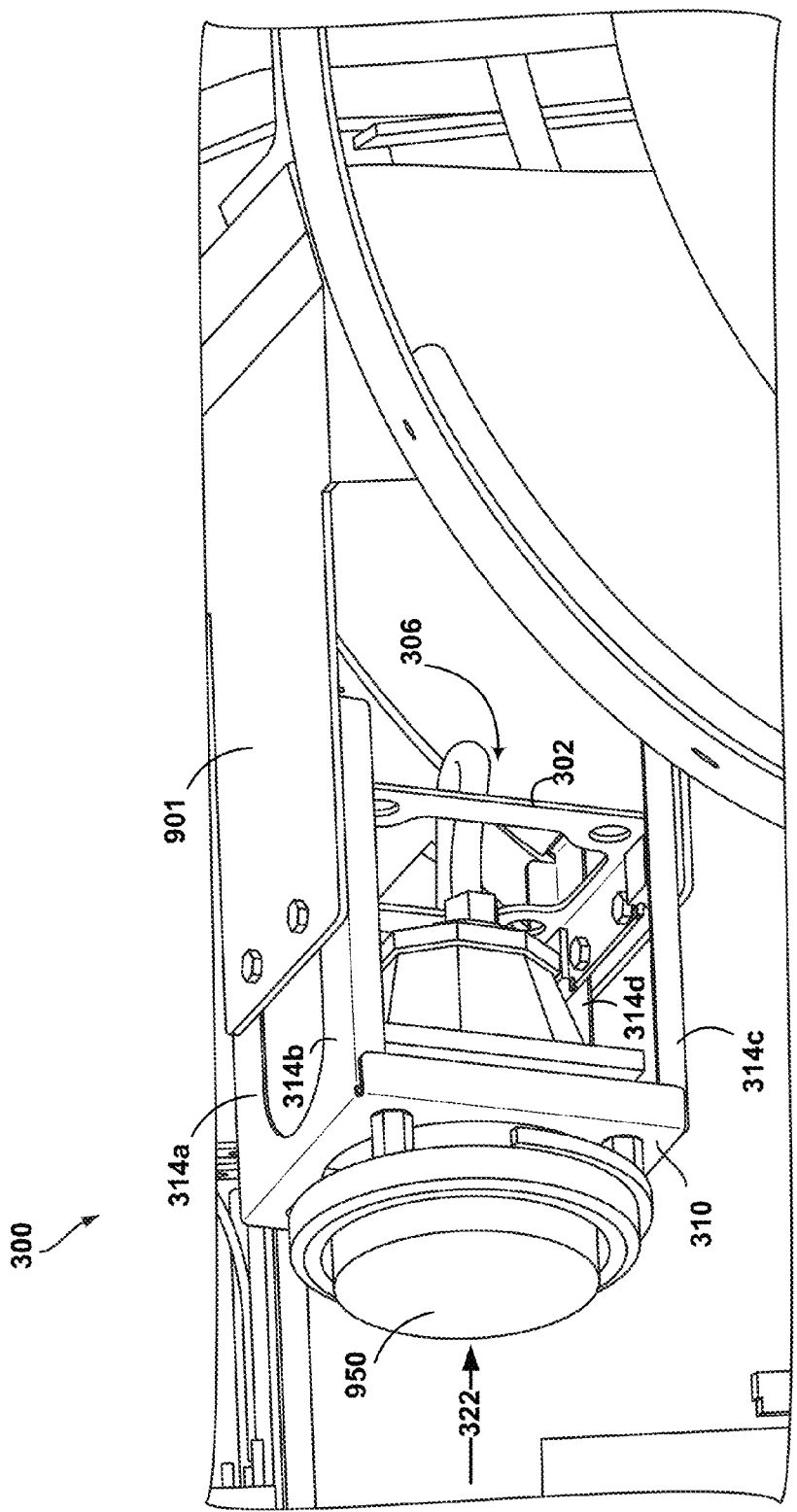
FIG. 10 illustrates an example system coupled to a vehicle support frame.

FIG. 10 illustrates the example system 300 coupled to a vehicle support frame, in accordance with at least some embodiments disclosed herein.

FIG. 10 shows the system 300 after the object-support module 310 has moved toward the mounting module 302 along a first axis of the system 300 in response to the threshold force 322 being applied to the object-support module 310 or the object 950. In such a case, the rails 314a-d of the motion-guiding module, a friction strip attached to one of the rails 314a-d, or magnets of the mounting module 302 may have absorbed at least some of an impact force applied to the object-support module 310 along the first axis 318.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A system comprising:
   a mounting module configured to be coupled to a support frame;
   an object-support module configured to support an object, wherein the mounting module comprises an area configured to allow at least a portion of an object supported by the object-support module to pass through the area; and
   a motion-guiding module coupled to the object-support module and the mounting module, wherein the motion-guiding module is configured to guide motion of the object-support module along a first axis of the system toward the mounting module in response to a threshold force applied to the object-support module along the first axis, wherein the motion-guiding module is configured to resist motion of the object-support module along a second axis of the system that is perpendicular to the first axis of the system.

2. The system of claim 1, wherein the motion-guiding module comprises a rail configured to guide motion of the object-support module along the first axis.

3. The system of claim 1, wherein the motion-guiding module is configured to absorb an impact force applied to the object-support module along the first axis.

4. The system of claim 3, wherein the system further comprises a magnet configured to absorb the impact force via an attractive magnetic force between the motion-guiding module and the magnet.

5. The system of claim 3, wherein the motion-guiding module is configured to absorb the impact force via friction between the (i) motion-guiding module and (ii) the mounting module or the object-support module.

6. The system of claim 5, wherein the motion-guiding module comprises a rail configured to guide motion of the object-support module along the first axis, wherein the rail further comprises a friction strip configured to absorb the impact force via friction between the (i) friction strip and (ii) the mounting module or the object-support module.

7. The system of claim 1, wherein the system further comprises a magnet configured to apply to the motion-guiding module a substantially constant attractive force substantially along the second axis of the system while the object-support module is at any position along the first axis of the system.

8. The system of claim 7, wherein the motion-guiding module comprises a metal rail and the magnet is configured to apply the substantially constant attractive force to the metal rail.

9. The system of claim 7, wherein the substantially constant attractive force resists motion of the object-support module along the first axis of the system.

10. The system of claim 1, wherein the mounting module or the object-support module comprises a magnet configured to apply to the motion-guiding module an attractive force along the first axis of the system.

11. The system of claim 10, wherein the attractive force decreases as the magnet loses contact with the motion-guiding module or the object-support module moves closer to the mounting module.

12. The system of claim 10, wherein the attractive force resists motion of the object-support module along the first axis.

13. The system of claim 1, wherein the motion-guiding module comprises a compressible section configured to compress in response to the threshold force applied to the object-support module along the first axis.

14. The system of claim 13, wherein the object-support module is configured to move along the first axis toward the mounting module as the compressible section is compressed.

15. A vehicle comprising:
   a support frame, wherein the support frame is configured to be coupled to a system comprising:
      a mounting module configured to be coupled to the support frame;
      an object-support module configured to support a component of the vehicle, wherein the mounting module comprises an area configured to allow at least a portion of a component supported by the object-support module to pass through the area; and
      a motion-guiding module coupled to the object-support module and the mounting module, wherein the motion-guiding module is configured to guide motion of the object-support module along a first axis of the system toward the mounting module in response to a threshold force applied to the object-support module along the first axis, wherein the motion-guiding module is configured to resist motion of the object-support module along a second axis of the system that is perpendicular to the first axis of the system.

16. The vehicle of claim 15, wherein the motion-guiding module comprises a compressible section configured to compress in response to the threshold force applied to the object-support module along the first axis.

17. The vehicle of claim 15, wherein the system further comprises a magnet configured to apply to the motion-guiding module a substantially constant attractive force substantially along a second axis of the system while the object-support module is at any position along the first axis of the system, wherein the second axis is perpendicular to the first axis.

18. A system comprising:
a mounting module configured to be coupled to a support frame;
an object-support module configured to support an object, wherein the mounting module or the object-support module comprises a magnet; and
a motion-guiding module coupled to the object-support module and the mounting module, wherein the motion-guiding module comprises a rail configured to guide motion of the object-support module along an axis of the system toward the mounting module in response to a threshold force applied to the object-support module along the axis, wherein the magnet and the motion-guiding module are attracted by a magnetic force to resist motion of the object-support module along the axis.

19. The system of claim 18, wherein the axis is a first axis, wherein the mounting module comprises an area configured to allow at least a portion of an object supported by the object-support module to pass through the area, wherein the motion-guiding module is configured to resist motion of the object-support module along a second axis of the system that is perpendicular to the first axis of the system.

20. The system of claim 18, wherein the rail comprises a given portion having a thickness that is greater than a thickness of an additional portion of the rail, wherein the given portion of the rail is configured to increase a magnetic attractive force between the rail and the magnet as the magnet moves past the given portion of the rail.

* * * * *